United States Patent [19]
Husby et al.

[11] Patent Number: 5,960,523
[45] Date of Patent: Oct. 5, 1999

[54] SEAT BELT BUCKLE SENSOR

[75] Inventors: Harald Snorre Husby; Vihang C. Patel, both of Lakeland; Ashok F. Patel, Wesley Chapel, all of Fla.

[73] Assignee: Breed Automotive Technology, Inc., Lakeland, Fla.

[21] Appl. No.: 09/139,443

[22] Filed: Aug. 25, 1998

[51] Int. Cl.$^6$ .................................................. A44B 11/00
[52] U.S. Cl. ................................. 24/633; 24/303; 24/642
[58] Field of Search .......................... 24/633, 642, 303, 24/66.1

[56] References Cited

U.S. PATENT DOCUMENTS

| | | |
|---|---|---|
| 4,384,391 | 5/1983 | Lindblad et al. ......................... 24/633 |
| 4,785,906 | 11/1988 | Kang . |
| 4,885,566 | 12/1989 | Aoki et al. . |
| 4,995,640 | 2/1991 | Saito . |
| 5,133,425 | 7/1992 | Han . |
| 5,233,732 | 8/1993 | Yamanishi ................................. 24/303 |
| 5,454,591 | 10/1995 | Mazur et al. . |
| 5,474,327 | 12/1995 | Schousek . |
| 5,626,359 | 5/1997 | Steffens, Jr. et al. . |
| 5,675,134 | 10/1997 | Swart et al. . |
| 5,742,986 | 4/1998 | Corrion et al. ........................... 24/303 |
| 5,752,299 | 5/1998 | Vivacqua et al. ......................... 24/633 |
| 5,839,174 | 11/1998 | Chamings et al. ........................ 24/633 |

OTHER PUBLICATIONS

Research and Development Publication—General Motors; Apr. 1, 1997.

*Primary Examiner*—Victor N. Sakran
*Attorney, Agent, or Firm*—Lonnie Drayer; Patrick Stiennon

[57] ABSTRACT

A seat belt buckle incorporates a spring mounted on the latch. When the latch engages with the tongue of a seat belt, the tongue can move against the spring in response to tension loading of the seat belt while remaining securely latched. This motion due to belt tension is resisted by the spring, with a selected spring constant. A sensor is used to monitor the presence and position of the tongue either directly or by measuring motion of the latch. The position information, which is related to spring compression, is used to determine loading on the tongue and thus seat belt tension.

21 Claims, 9 Drawing Sheets

SEAT BELT BUCKLE SENSOR

FIELD OF THE INVENTION

The present invention relates in general to sensors used to determine when and how an airbag should be deployed and in particular to sensors for monitoring seat belt latch status and belt tension.

BACKGROUND OF THE INVENTION

Airbags were developed to protect occupants of motor vehicles during crashes. Originally airbags were viewed as an alternative to seat belts, because they are passive devices which do not require the cooperation of the vehicle's occupants to be effective. However, experience has shown that airbags should be considered an adjunct to seat belts. When used properly, airbags can in certain crash situations reduce injuries to vehicle occupants. An airbag is a gas filled bag which is rapidly deployed in the event of a vehicle crash. When appropriate sensors determine that a crash situation has occurred, the airbag is rapidly inflated to create an impact cushion between the occupant(s) of a vehicle and the structure of the vehicle.

An airbag system comprises two basic functional components: the airbag, including the means for deploying it; and the sensors and circuitry which determine whether the airbag should be deployed.

Recently, sensors have been developed to determine the weight imposed on the front seat, and the value of the determined weight may then be used as an input into the system logic which determines whether or not an airbag should be deployed, or whether the mode of deployment should be modified. In some cases, these weight sensors can be confused by loads imposed by the compression of the seat resulting from installing a child's car seat and tensioning the seat belt to hold the child seat into place. Another area of concern as a factor to be considered by airbag deployment logic is whether the occupant is properly wearing a seat belt.

Sensors to determine if a seat belt is buckled were first widely used to remind the occupants of a motor vehicle to fasten their seat belts. Recently, airbags have been used in automobiles to enhance and complement the protection provided by seat belts. This combination of seat belts and airbags can be optimized if it can be determined that the seat belt is actually in use. If the seat belt is fastened, then deployment logic can be based on knowledge of that condition. Accurate sensing information of seat-belt latch status is far more important when used as part of the decision logic and deployment strategy of an airbag system then when used simply as part of a seat belt fastening reminder system.

The typical improved seat belt latch indicating system such as might be used in combination with an airbag deployment system, is a mechanical switch within the buckle of a seat belt combined with a resistor network. The simplest resistor network has a first resistor connected in series with the switch and a second resistor connected in parallel with the switch. Thus the resistance of the switch and the resistor network changes when the switch is closed. But the switch, because of the resistor connected in parallel across the open leads of the switch, can be positively monitored when open. Thus if resistance falls to zero or has a resistance value substantially different from the two designed states of the switch and resistor network, it is clear that the seat belt latch detector is broken.

The environment in which seat belts are installed can be a hostile one. The switch is called upon to operate when dirty, wet, or even when coated with residue from spilled soft drinks. Further, the use of seat belt latch sensors to sound reminder chimes or a buzzer is sometimes perceived as annoying, and can lead those resistant to wearing safety belts to disable a seat belt latch indicator by causing the buckle to latch without engaging the hasps of the belt. Where seat belt latching information is being used in an airbag deployment logic, the folly of disabling safety equipment can prevent the deployment logic from making the best possible decision by providing false information to the logic.

What is needed is a seat belt sensor which can monitor latch status and belt tension, and which is both durable and better able to monitor latch status.

SUMMARY OF THE INVENTION

The seat belt buckle of this invention has a spring mounted on the seat belt latch. When the seat belt latch engages with the tongue of a seat belt, the tongue can move against the spring in response to tension loading of the seat belt while remaining securely latched. This motion due to belt tension is resisted by the spring, which has a known spring constant. A sensor is used to monitor the presence and position of the tongue and/or latch. The position information is used to determine loading on the tongue and thus seat belt tension. Two basic embodiments are described. The first embodiment includes a latch integral with an L-shaped member. The latch is joined to a leaf spring which biases the latch to a first position. The L-shaped member controls the motion of the latch and has a magnet mounted thereon. A sensor mounted to the buckle monitors the vertical position of the magnet which correlates with whether the seat belt is latched and whether the tongue is present within the buckle. Slight movement of the latch and attached L-shaped member then takes place as tension on the tongue moves the latch against the spring. This motion of the magnet away from the sensor is used to detect seat belt tension.

A second embodiment employs a magnet and magnetic field sensor positioned on either side of the portion of the latch which retains the seat belt tongue. A spring is mounted on the latch which prevents the tongue from directly engaging the seat belt latch. The spring is compressed by seat belt tension which pulls the tongue against the spring. The magnetic field sensor detects changes in magnetic field strength due to the position of the tongue. The position of the latch member also affects magnetic field strength and thus whether the seat belt is latched and whether a seat belt tongue is present can be determined with the same sensor which measures seat belt tension.

It is a feature on the present invention to provide a seat belt buckle which can monitor latch status and seat belt tension with a single sensor.

It is a further feature of the present invention to provide a seat belt buckle wherein seat belt tension causes the tongue of the seat belt to move relative to the buckle and wherein this relative movement is proportional to seat belt tension.

It is a yet further feature of the present invention to provide a seat belt buckle which provides seat belt latch status and seat belt tension which can be used in conjunction with other sensors to inform an airbag deployment logic.

Further objects, features and advantages of the invention will be apparent from the following detailed description when taken in conjunction with the accompanying drawings.

DETAILED DESCRIPTION OF THE INVENTION

Figure 1:
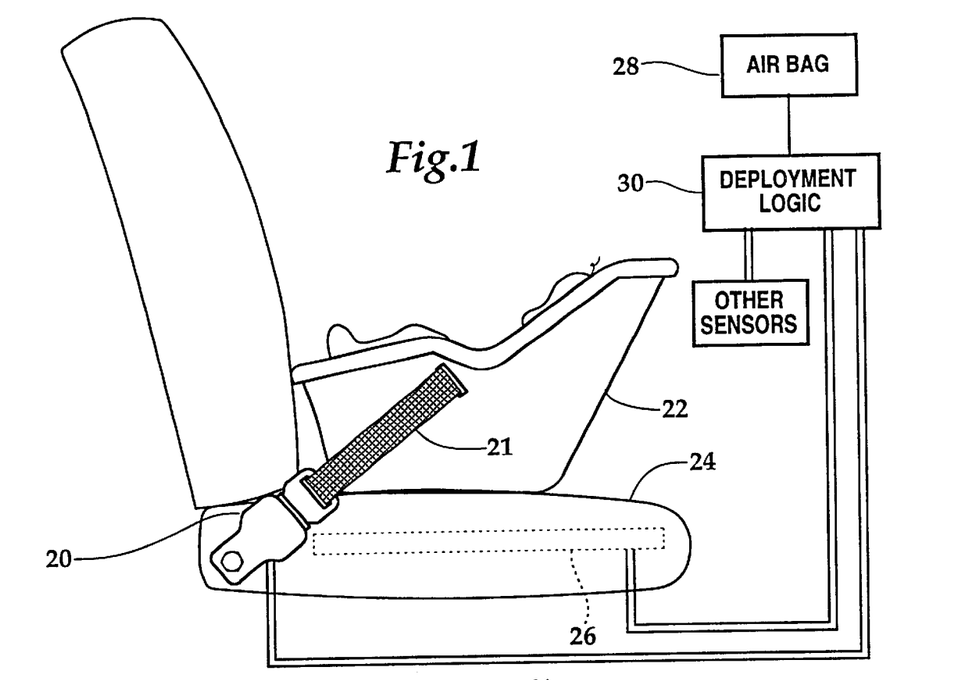
FIG. 1 is a front elevation schematic view of a child's car seat in the front passenger seat of a vehicle.
Figure 2:
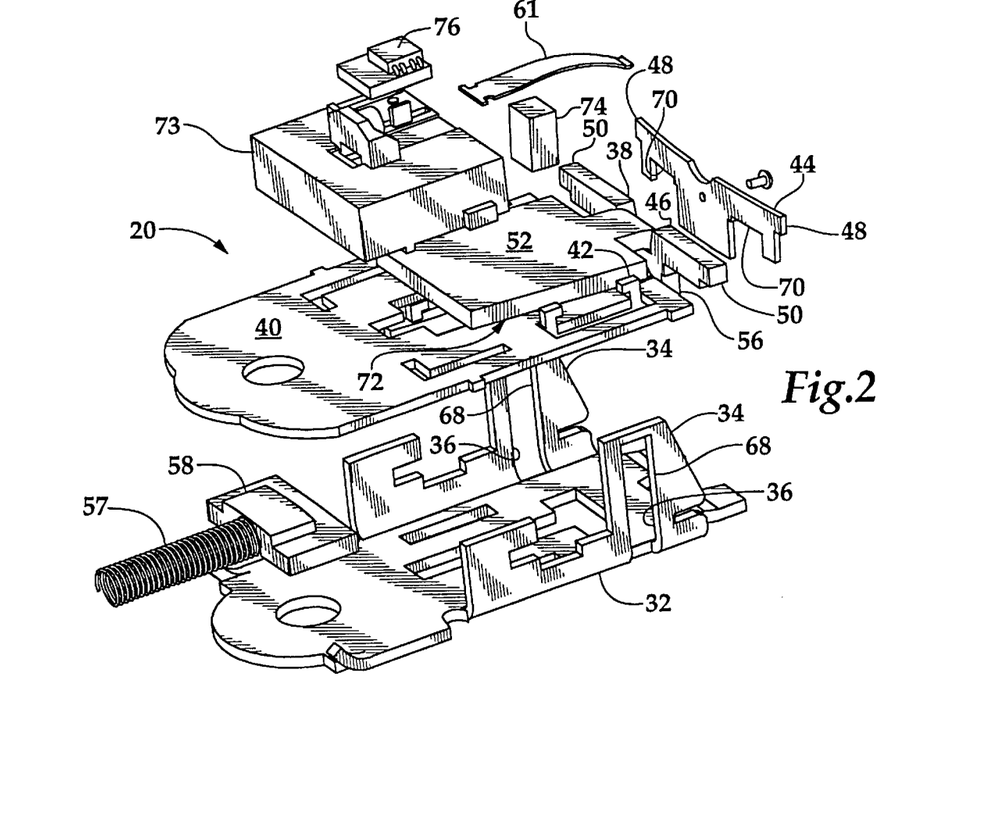
FIG. 2 is an exploded isometric view of the seat belt buckle of this invention.

Referring to FIGS. 1–15 wherein like numbers refer to similar parts, a seat belt buckle 20 is shown in FIGS. 1 and 2. The seat belt buckle 20 is shown attached to a seat belt 21 that holds a child's car seat 22 positioned in a front passenger seat 24. A weight sensor 26 is connected to a microprocessor which deploys an airbag 28 when the deployment logic 30 calculates that deployment of the airbag 28 is required. The microprocessor shown as the deployment logic 30 receives input from various crash sensors. The deployment logic 30 also receives a signal from the seat belt buckle 20 which indicates whether the seat belt buckle 20 is latched and the tension on the seat belt 21 if the buckle is latched.

Figure 7:
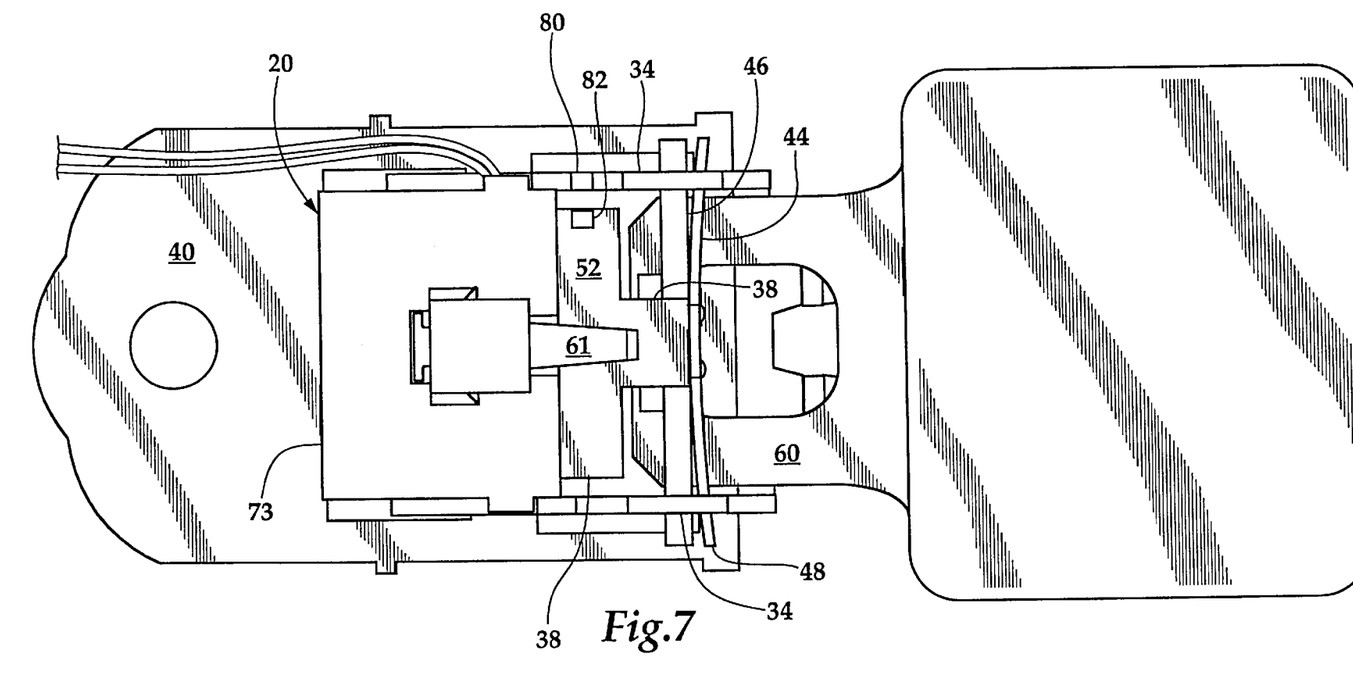
FIG. 7 is a top plan view of the seat belt buckle of FIG. 2 shown in the latched position.

The seat belt buckle 20, as shown in FIG. 2, has a base plate 32 with two upstanding tabs 34 which have vertical slots 36 which form guides for a latch 38. A structural housing plate 40 is engaged with the base plate 32 and is spaced from the base plate by spacers 42. The overall configuration of the belt buckle 20 has similarities to a conventional seat belt buckle, with the following modification which allows the buckle 20 to monitor latch status and seat belt tension. A bow shaped spring 44 moves with and is attached to the face 46 of the latch 38. The outer ends 48 of the spring 44 bend away from the outwardly extending ends 50 of the latch 38. The outwardly extending ends 50 of the latch and the outer ends 48 of the spring 44 ride in the guide slots 36 which are sufficiently wide to accommodate both the latch 38 and the spring 44, as shown in FIG. 7.

Figure 3:
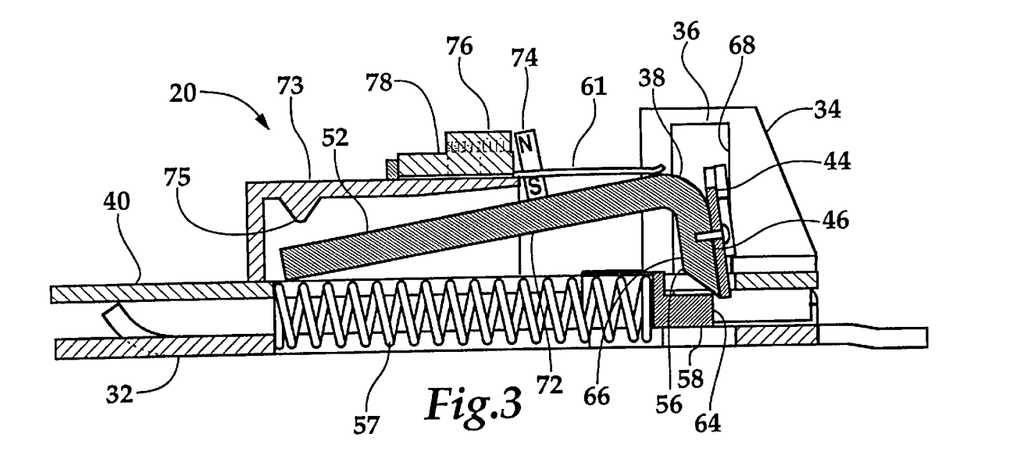
FIG. 3 is a side elevation cross-sectional view of the seat belt buckle of FIG. 2 in the unlatched position.

The latch 38 has a guide plate 52 which controls the motion of the latch 38 so that the larger guide slots 36 do not result in undesired motion of the latch 38. The guide plate 52, as shown in FIG. 3, is hold in engagement with the structural housing plate 40 by the latch following spring 61. This engagement between the guide plate 52 and the structural housing plate 40 controls the motion of the latch 38. The latch 38, as shown in FIGS. 3–6, has an L-shaped cross-section, with the tongue engaging portion 56 of the latch forming the short leg of the L and the guide plate 52 forming the long leg of the L. The guide plate 52 extends in a direction which is substantially perpendicular to the direction defined by the motion of the latch 38 as it engages the tongue 60 and the base plate 32. In FIG. 3 the seat belt buckle 20 is shown in the unlatched position with a spring 57 and an ejector 58 holding the latch 38 biased in an upward position opposing the downward biasing force of the latch following spring 61.

Figure 4:
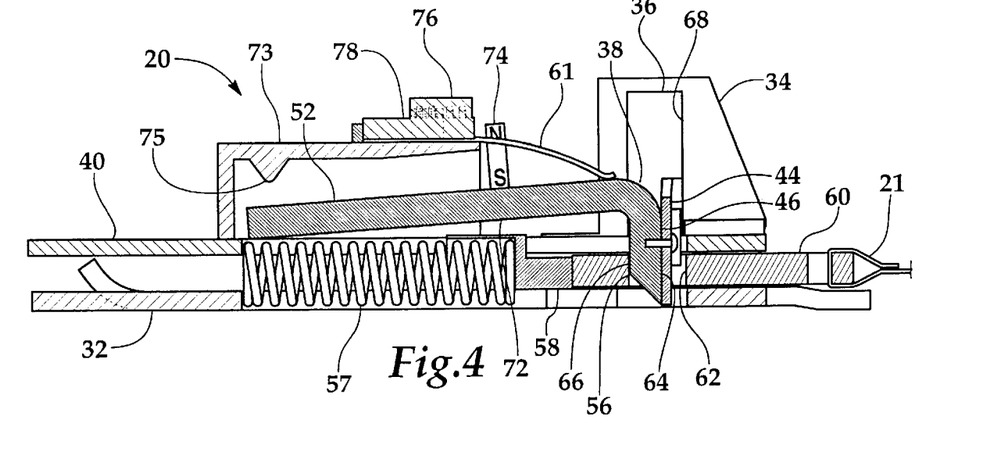
FIG. 4 is a side elevation cross-sectional view of the seat belt buckle of FIG. 2 in the latched position without tension on the seat belt.
Figure 5:
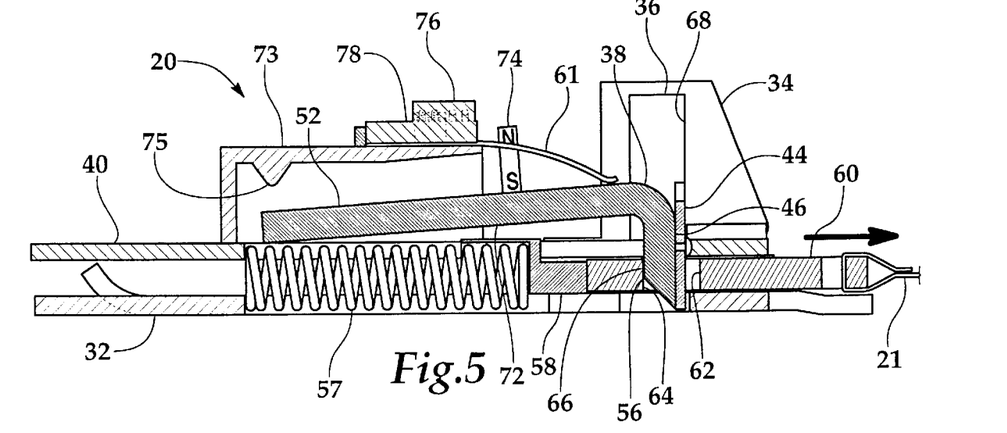
FIG. 5 is a side elevation cross-sectional view of the seat belt buckle of FIG. 2 in the latched position with tension on the seat belt.

FIG. 4 shows the seat belt buckle 20 latched to a seat belt tongue 60. The tongue 60 has an opening 62 through which the latch tongue engaging portion 56 passes to thereby lock the tongue 60 to the seat belt buckle 20. The opening 62 defines a latch engaging surface 64 which is held against the inside surface 66 of the tongue engaging portion 56 of the latch 38 by the spring 57 pushing against the ejector 58. The spring 44, as shown FIG. 4, biases the latch 38 towards the ejector 58 by engaging the upstanding sides 68 of the vertical slots 36. Tension on the seat belt 21 compresses the spring 44 and moves the entire latch 38 in the direction of the applied tension, as shown in FIG. 5.

Figure 6:
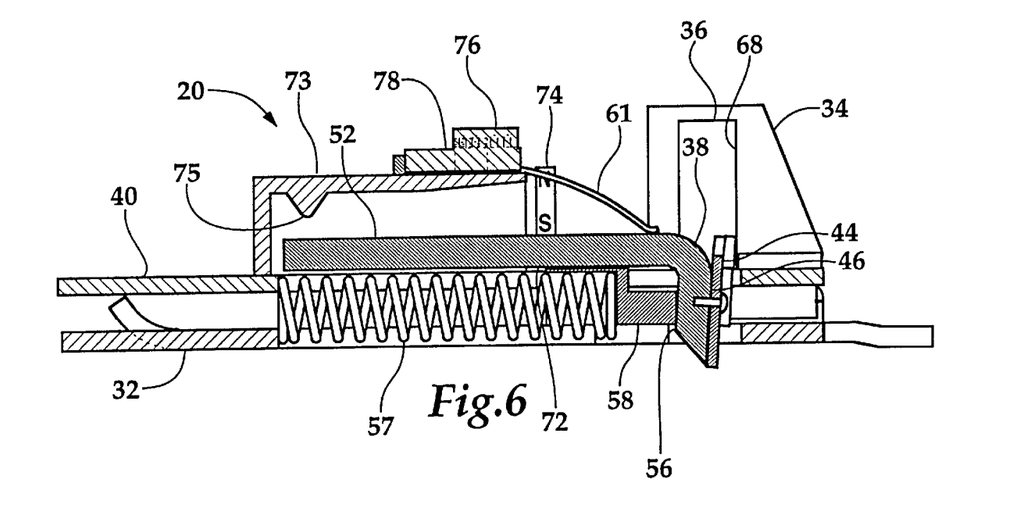
FIG. 6 is a side elevation cross-sectional view of the seat belt buckle of FIG. 2 in the latched position without a seat belt tongue.

If the seat belt buckle 20 is latched in the absence of the seat belt tongue 60, as shown in FIG. 6, the latch 38 can continue its downward rotation under the force the latch following spring 61. This is possible because the seat belt tongue 60 is not present to engage the underside 70 of the tongue engaging portion 56 of the latch 38. Therefore the tongue engaging portion 56 continues to move downwardly until the underside 72 of the guide plate 52 fully engages the structural housing plate 40, as shown in FIG. 6.

The full range of motion of the latch 38, both in its up and down motion and in its lateral motion in response to seat belt tension, can be monitored by placing a small magnet 74 on the latch 38 and measuring the magnetic field intensity at a suitable location fixed with respect to the seat belt buckle 20. A sensor 76 within an integrated circuit package 78 is mounted to a fixed portion of a latch follower spring support 73 which also encloses the guide plate 52 of the latch 38. The support 73 incorporates a ridge 75 which strengthens the support.

The sensor 76 is preferably of the Giant Magneto-Resistive (GMR) type and utilizes an effect discovered in 1988. The effect utilizes a phenomenon discovered in thin film devices that resistors built up of thin magnetic film a few nanometers thick separated by equally thin nonmagnetic layers have resistance which depends on the strength of a magnetic field applied to the resistor.

A decrease in resistance of between about ten and twenty percent in the built-up resistor is observed when a magnetic field is applied. The physical explanation for the decrease in resistance is the spin dependence of electron scattering and the spin polarization of conduction electrons in ferromagnetic metals. The extremely thin adjacent magnetic layers couple antiferromagnetically to each other so that the magnetic moments of each magnetic layer are aligned antiparallel to adjacent magnetic layers. Electrons, spin polarized in one magnetic layer, are likely to be scattered as they move between adjacent layers. Frequent scattering results in high resistance. An external magnetic field overcomes the anti-ferromagnetic coupling and produces parallel alignment of moments in adjacent ferromagnetic layers. This decreases scattering and thus device resistance.

Within an integrated circuit package groups of four resistors based on the GMR technology are arranged in a Wheatstone bridge and two legs of the bridge are shielded from the applied magnetic fields. The other two legs are positioned between the magnetic shields. The magnetic shields act as flux concentrators to produce a device of tailored sensitivity to a magnetic flux of a selected intensity. A standard voltage or current is supplied to the solid state device, while a value relating to current or voltage is read out which is proportional to the magnetic field to which the device is exposed. The devices have an axis of sensitivity which is produced by the orientation of the magnetic flux shields. In the sensor 76 this axis is aligned in a direction towards available 74. GMR sensors are available from Nonvolatile Electronics Inc. of 11409 Valley View Rd., Eden Prairie, Minn. (www.nve.com). GMR sensors are small, highly sensitive devices which have exceptional temperature stability, deliver high signal levels and require very little power and cost less than many competitive devices. All these factors are important in devices used in automobile safety applications.

The GMR sensor detects magnetic field strength. By properly positioning the magnet 74 it has been found possible to produce field strength readings for conditions in which the buckle is latched on a tongue, unlatched and latched without a tongue present. Motion of the tongue can be monitored because it overlaps the magnet and the sensor and affects the flux intensity transmitted from the magnet to the sensor. Thus each magnetic field strength measurement uniquely determines the status of the seat belt buckle 20 together with seat belt 21 tension. Although not absolutely necessary, the ability to obtain a unique signal for each condition of the seat belt buckle 20 provides for simpler logic in as much as knowledge of the prior states of the sensor is not necessary to determine the current state of the sensor 76.

FIG. 7 shows a top plan view of the seat belt buckle 20 wherein a sensor 80 has been positioned to one side of the spring support 73. A smaller shorter magnet 82 is positioned spaced above and mounted to the guide plate 52.

Figures 11, 12:
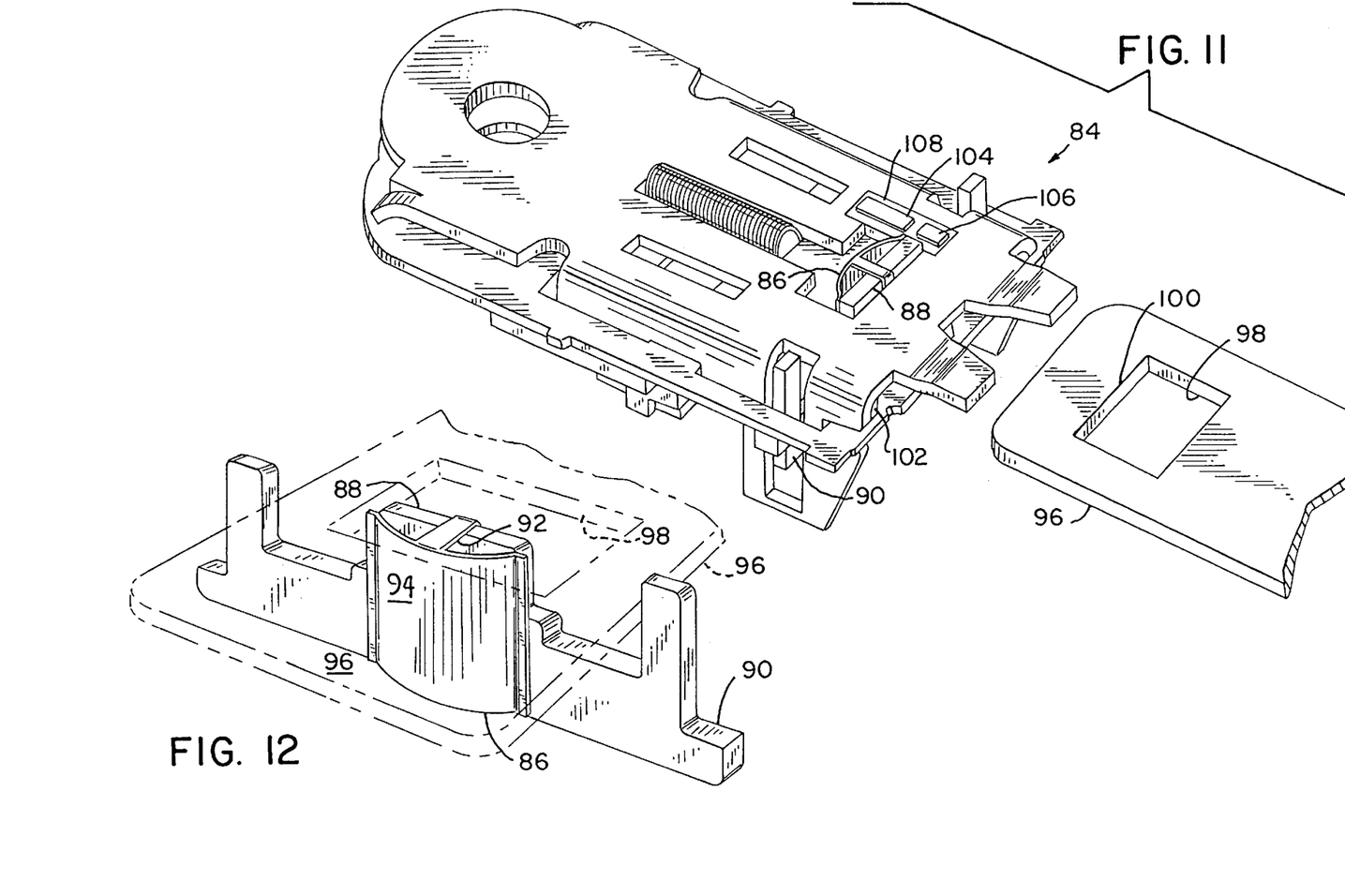
FIG. 11 is an isometric bottom view of a further alternative embodiment of the seat belt buckle of this invention.
FIG. 12 is an enlarged detail view of the latch member of the belt buckle of FIG. 13 with the seat belt tongue engaged against the tongue spring.
Figure 13:
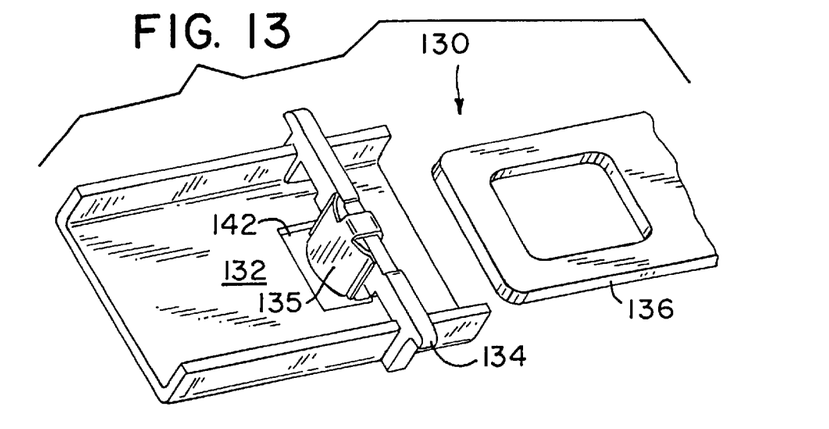
FIG. 13 is a simplified isometric view of another seat belt buckle, similar to that shown in FIG. 8, shown in an unlatched position.

An alternative embodiment seat belt buckle 84 is shown in FIG. 11. A spring 86 is mounted to the latching portion 88 of a latch 90. The spring 86 is similar to the spring 44 shown in FIG. 2. The tongue 96 has an opening 98 through which the latching portion 88 passes. The opening 98 defines an engagement side 100. Tension on the tongue 96 causes the engagement side 100 to push against the latch 90, thereby compressing the spring 86 and allowing the tongue to move towards the tongue receiving opening 102 of the buckle 84. A GMR sensor 104 and a magnet 106 are contained in a sensor housing 108 which is inset into a base plate. The GMR sensor 104 detects the strength of the field produced by the magnet 106 as it varies due to the position of the latch 90, tongue 96 and the latch opening 98. The tongue 96 is constructed of ferromagnetic material and the latch 90 is also constructed of ferromagnetic material with the result that the magnetic field strength at the sensor 104 is dependent on the position of the latch 90 and the tongue 96.

The seat belt buckle 84 can detect latch status because the movement of the latch 90 towards and away from the sensor housing 108 will affect the magnetic field strength detected by the sensor 104. The presence of the tongue 96 can also be detected. Moreover, as greater levels of tension on the tongue 96 will result in greater displacement of the latch 90, the sensor can also detect magnitude of tension on the belt. In general, high levels of tension may indicate the presence of a child's car seat, as a seat belt wearer would typically find such high levels of tension uncomfortable.

Figure 8:
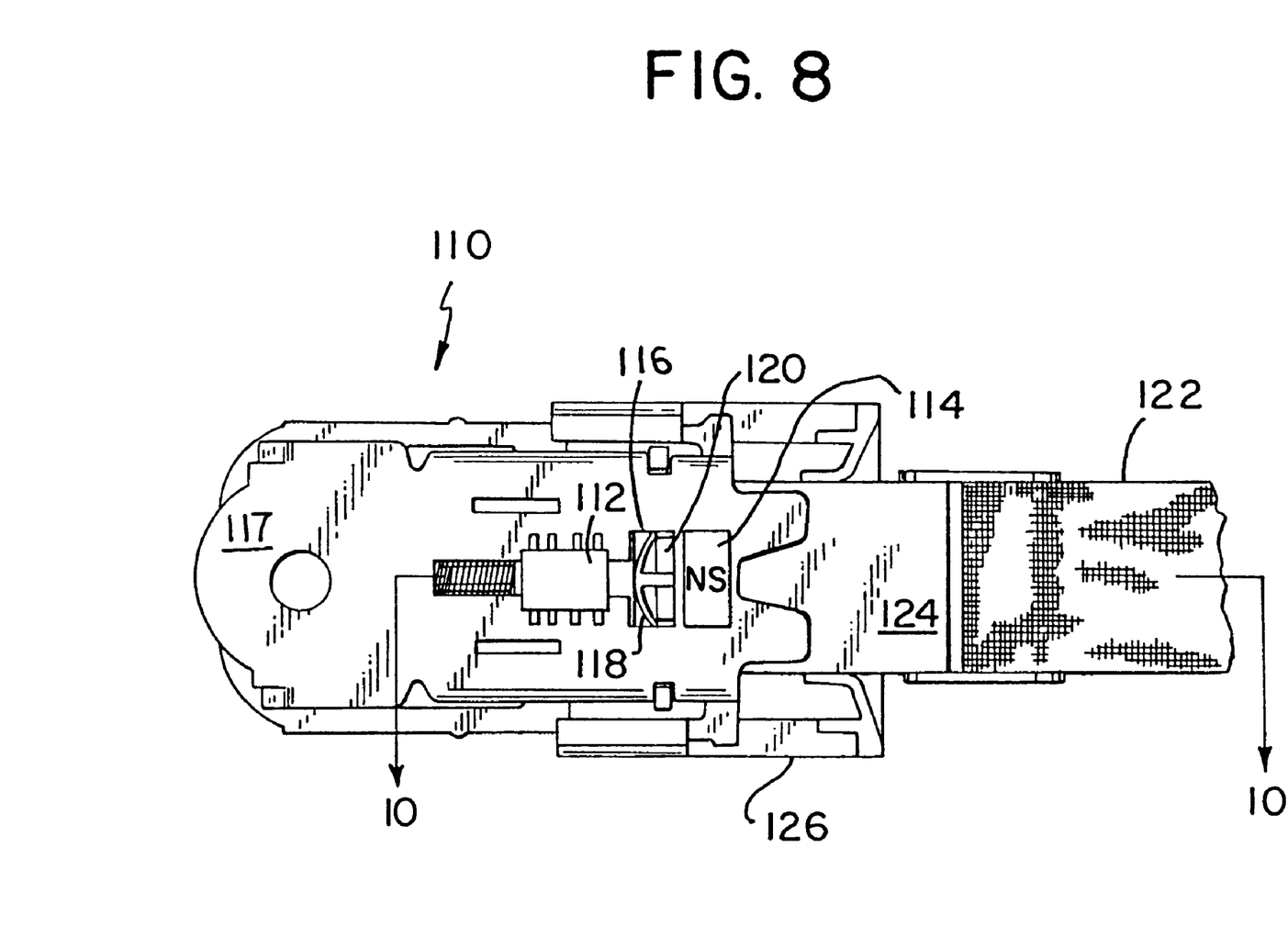
FIG. 8 is a bottom plan view of an alternative embodiment seat belt buckle and seat belt tongue of this invention without tension on the seat belt.
Figure 9:
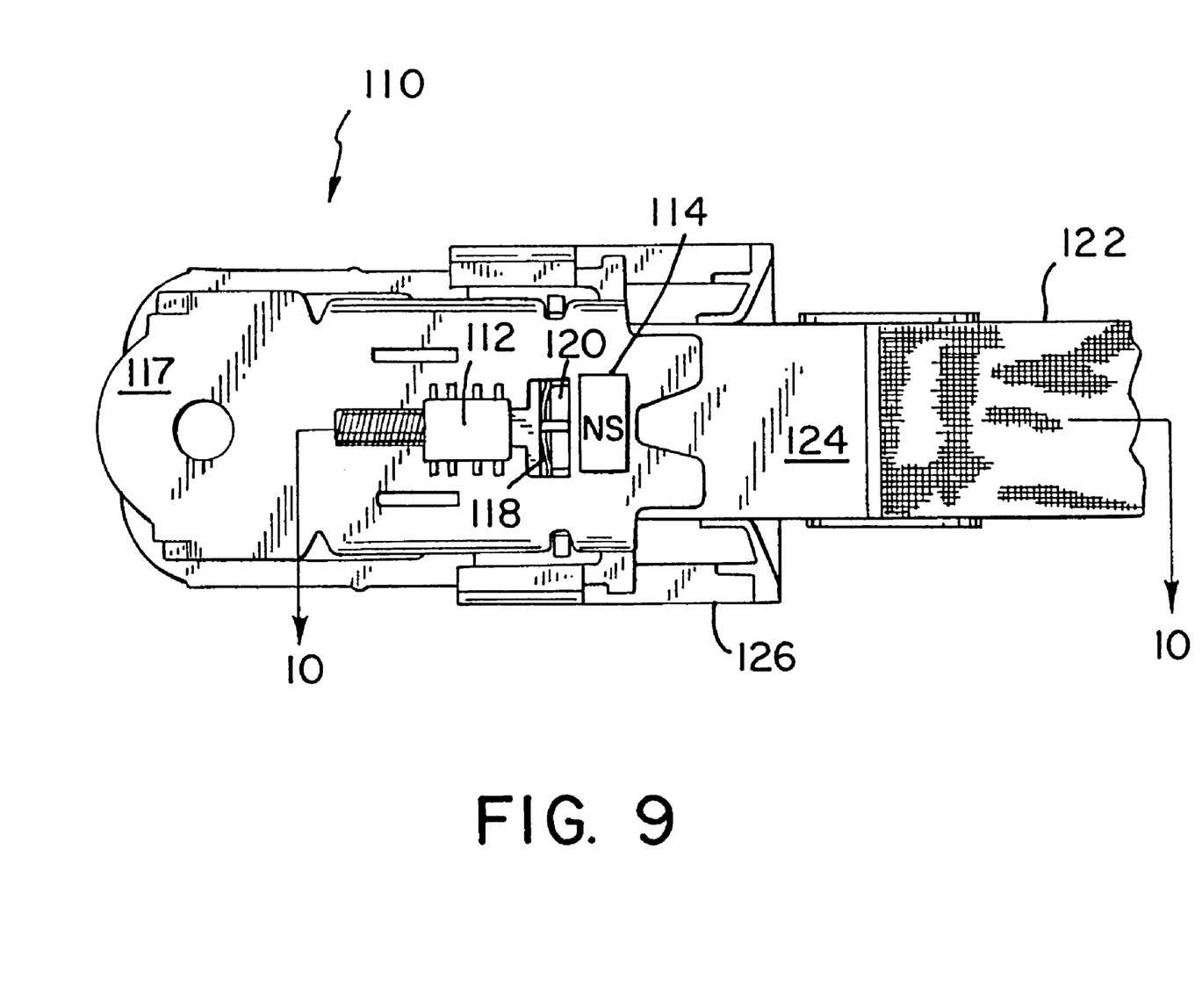
FIG. 9 is a bottom plan view of the seat belt buckle of FIG. 8 with tension on the seat belt.
Figure 10:
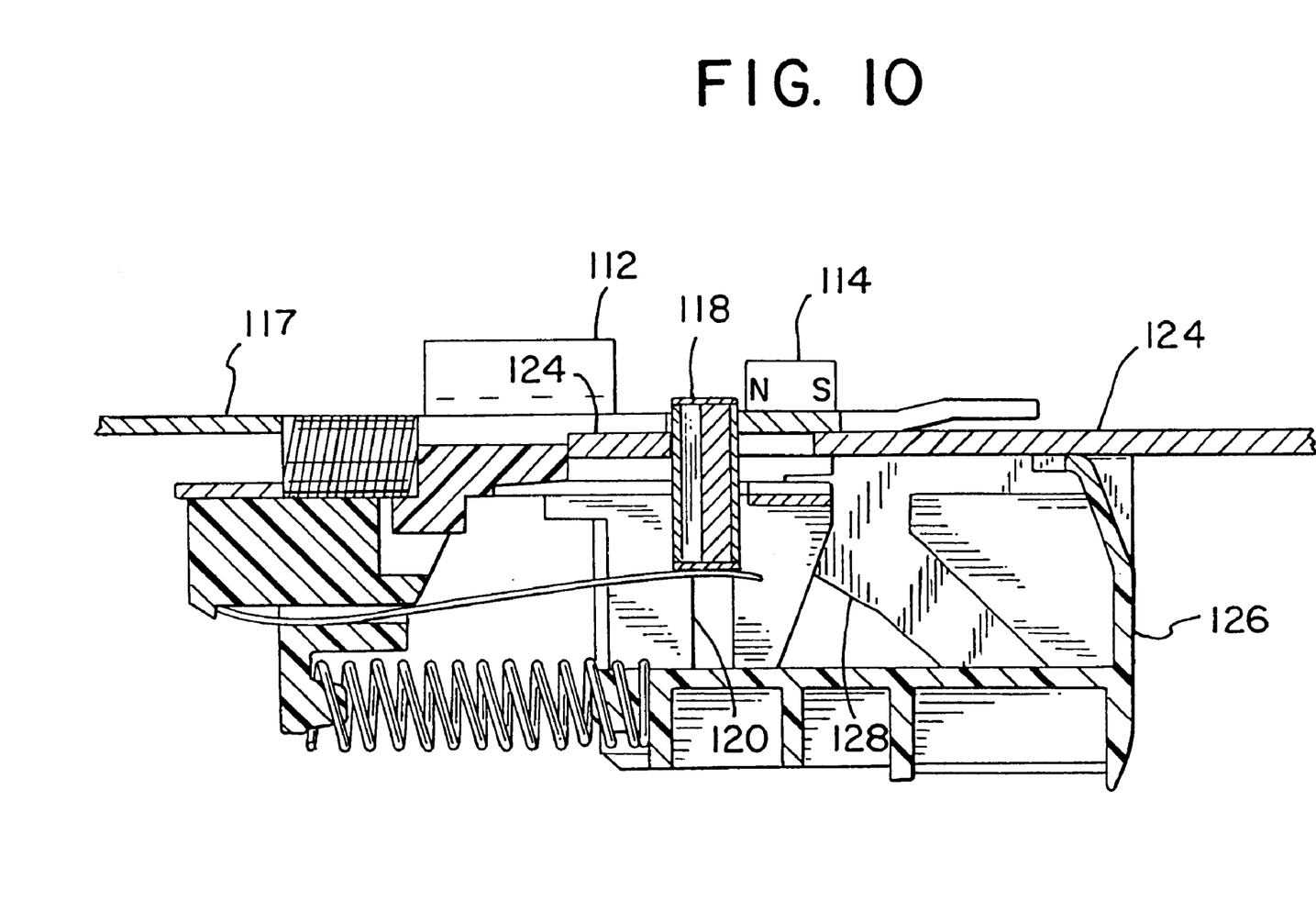
FIG. 10 is a cross-sectional view of the seat belt buckle of FIG. 9 taken the section line 10—10.

A further embodiment seat belt buckle 110 is disclosed in FIGS. 8–10. A sensor 112 and magnet 114 are positioned on either side of the latch opening 116 in the base plate 117 of the buckle 110. A spring 118 positioned on the latch 120 similar to the one shown in FIG. 12 is employed. The spring 118 is constructed of ferromagnetic material so that compression of the spring 118 affects the transmission of magnetic field lines between the magnet 114 and the sensor 112.

Tension on the seat belt 122 pulls a tongue 124 against the spring 118. This displacement of the tongue 124, as shown in FIG. 9, changes the strength of the magnetic field which is carried through the ferromagnetic tongue 124. FIG. 10 shows the tongue 124 pulling again the spring 118 and the position of the sensor 112 and the magnet 114. A seat belt slider 126 is also shown in FIGS. 8–10. A similar slider may be employed with the seat belt buckle 20 in FIG. 2. The slider 126 employs cam surfaces 128 which engages the outer ends of the latch, and when depressed retracts the latch 120 releasing the seat belt tongue 124.

Figure 14:
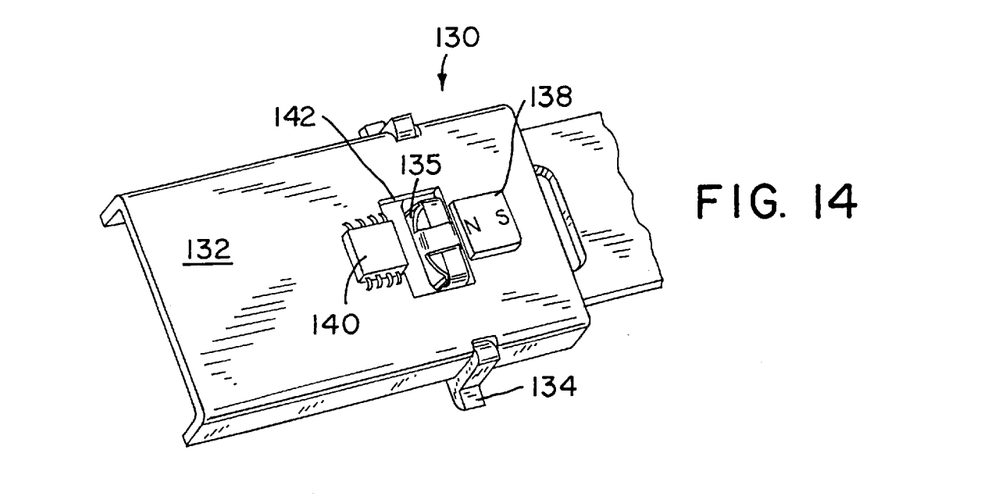
FIG. 14 is an isometric view of the seat belt buckle of FIG. 13 in the latched position without tension on the tongue.
Figure 15:
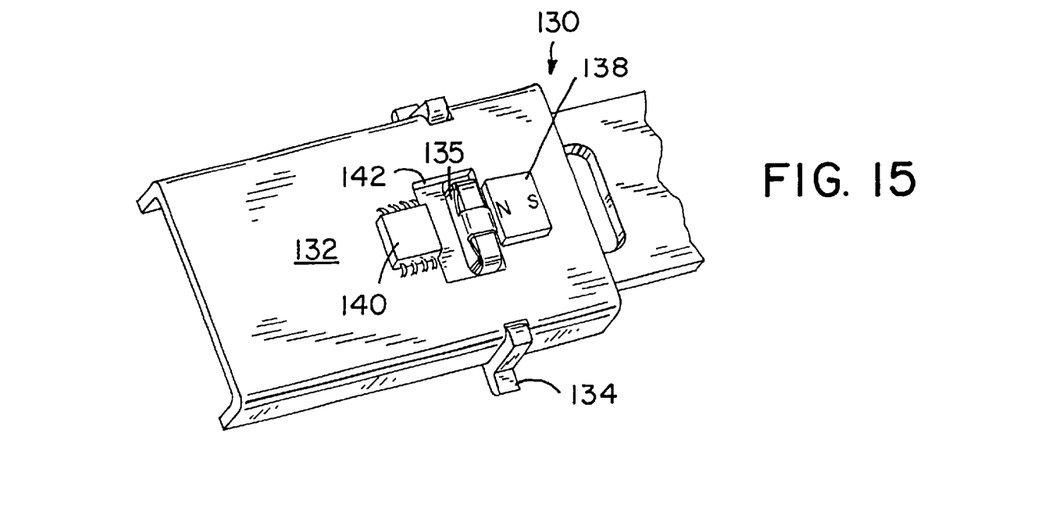
FIG. 15 is an isometric view of the seat belt buckle of FIG. 13 with the tongue under tension.

A simplified bolt buckle 130 of this invention is shown in FIGS. 12, 13, 14 and 15, in which, for illustrative purposes, conventional portions of the buckle assembly have not been shown. FIG. 12 shows the interaction of a seat belt tongue 136 with a ferromagnetic latch spring 134. For clarity, in FIGS. 13, 14, and 15 only a buckle body 132, a latch 134, a latch spring 135, and a seat belt tongue 136 are shown together with a magnet 138 and a sensor 140 positioned on either side of the latch opening 142 of the buckle body 132. FIGS. 14 and 15 show the displacement of the tongue as seat belt tension pulls the seat belt against a person occupying the passenger seat. Seat belt usage becomes extremely uncomfortable with belt tension in excess of about 8 pounds force. A child's car seat, on the other hand, can be fairly easily tensioned to levels in excess of twenty pounds force. Therefore, typically, the sensing spring will bottom out at approximately twenty pounds tension. Thus seat belt tension is a good indicator of whether a person or a child's car seat occupies the front passenger seat. This information concerning seat belt tension can also be used in conjunction with a seat weight sensor to determine the true weight of the seat occupant. The true weight of the seat occupant, in combination with seat belt tension measurements, can be used by deployment logic to decide how and if to deploy an airbag.

It should be understood that magnetic field sensors employing other technologies including, but not limited to, silicon-based Hall effect devices, GaAs based Hall effect devices, magneto-resistive devices, including anisotropic magneto-resistive (AMR) and other sensors capable of detecting static or dynamic magnetic fields could be employed.

It should further be understood that the magnet may be linked or attached to various portion of the latch or directly mounted to the seat belt buckle. The magnetic field sensor may be directly responsive to motion of the magnet or responsive to moment of a flux concentrator or shunt.

It is understood that the invention is not limited to the particular construction and arrangement of parts herein illustrated and described, but embraces such modified forms thereof as come within the scope of the following claims.

We claim:

1. A seat belt buckle incorporating a belt tension sensor, comprising:

a seat belt buckle having a base;

a seat belt latch mounted for movement on the base, the latch having a tongue engagement portion, the tongue engagement portion extensible through an opening defined by portions of the base;

a tongue having portions defining a latch engaging opening, and a first portion of the tongue which is in load supporting engagement with the latch, the tongue being engageable with the latch to lock the tongue to the buckle;

a spring mounted to the latch so that when the tongue first portion is pushed against the latch tongue engagement portion, the spring is compressed;

a magnetic field sensor mounted on the buckle; and a magnet mounted on the buckle so as to cause a magnetic field at the sensor, wherein motion of the tongue away from the buckle to elastically deform the spring changes the intensity of the magnetic field at the sensor in proportion to the compression of the spring and thus in proportion to the belt tension.

2. The seat belt buckle of claim 1 wherein the magnetic field sensor is of the GMR type.

3. The seat belt buckle of claim 1 wherein the magnet is mounted to the latch and the sensor is mounted to a non-moving portion of the buckle, so that motion of the latch in response to motion of the tongue causes a change in the magnetic field at the magnetic field sensor.

4. The seat belt buckle of claim 1 wherein the spring is positioned to be compressed between the latch and a portion of the base.

5. The seat belt buckle of claim 1 further comprising portions of the latch which extend substantially perpendicular to the direction defined by the motion of the latch which results in the latch engaging the tongue, said portions positioned for sliding engagement with a fixed portion of the buckle.

6. A seat belt buckle incorporating a belt tension sensor comprising:

a seat belt buckle, having a base;

a seat belt tongue which mates with the buckle;

a latch mounted for movement on the base to engage the tongue, the latch having a tongue engagement surface;

a spring mounted to the tongue engagement surface, the spring positioned between the tongue engagement surface and the seat belt tongue when the tongue is mated with the buckle;

a magnet rigidly mounted to the seat belt buckle; and a magnetic field sensor positioned spaced from the magnet and mounted to the seat belt buckle so that motion of the tongue against the spring changes the magnetic field present at the sensor.

7. The seat belt buckle of claim 6 wherein the spring mounted to the tongue engagement surface is ferromagnetic.

8. The seat belt buckle of claim 6 wherein the base has a latch receiving opening through which the latch moves when it is engaged with the tongue, and wherein the magnet and the magnetic field sensor are positioned on either side of the latch receiving opening.

9. The seat belt buckle of claim 6 wherein the magnetic field sensor is of the GMR type.

10. The seat belt buckle of claim 6 wherein the spring is positioned to be compressed between the latch and a portion of the base.

11. A seat belt buckle incorporating a belt tension sensor comprising:

a seat belt buckle, having a base, the base having portions defining an opening;

a seat belt tongue retained within the seat belt buckle:

a latch mounted on the base for motion toward and away from the opening, the latch being engageable with a portion of the base which defines the opening to retain a seat belt tongue;

a latch follower, and follower spring, the follower spring biasing the latch follower toward the latch;

a compressible spring positioned to bias the the seat belt tongue in a direction opposed to seat belt tension;

a magnet mounted on the buckle; and a magnetic field sensor mounted on the buckle spaced from the magnet, wherein the magnet and magnetic field sensor are mounted such that compression of the compressible spring by the tongue connected to a seat belt results in a change in magnetic field strength due to the position of the tongue, and wherein the varying magnetic field at the magnetic field sensor is in proportion to the compression of the spring and thus in proportion to the belt tension.

12. The seat belt buckle of claim 11 wherein the compressible spring is mounted between the latch and the latch follower.

13. The seat belt buckle of claim 12 wherein the magnet and the magnetic field sensor are mounted on the base.

14. The seat belt buckle of claim 11 wherein the magnetic field sensor is of the GMR type.

15. The seat belt buckle of claim 11 wherein the magnet and magnetic field sensor are contained in a unitary housing which is inset into the base and positioned to overlie the seat belt tongue when the tongue is mated with the buckle.

16. The seat belt buckle of claim 11 wherein the compressible spring is positioned between the latch and the base.

17. The seat belt buckle of claim 16 further comprising a guide plate connected to the latch and extended substantially perpendicular to a direction defined by motion of the latch toward and away from the opening, and wherein the magnet is mounted to the guide plate and moves with the guide plate as the guide plate follows the latch.

18. The seat belt buckle of claim 17 wherein the guide plate is captured within a housing and wherein the guide plate engages with a housing plate which is mounted to the seat belt base.

19. A seat belt buckle and sensor arrangement for detecting seat belt latch status and seat belt tension comprising:

a buckle having a base;

a tongue engageable with the base;

a latch mounted on the base and movable to engage the tongue with the base;

a spring positioned to bias the tongue in a direction opposed to tension in a seat belt connected to the tongue; and a magnet and a magnetic field sensor, the magnet being spaced from the magnetic field sensor, the magnet and the magnetic field sensor being mounted to the buckle and positioned to detect latch motion to engage the tongue and motion of the tongue again the spring produced by seat belt tension.

20. The seat belt buckle and sensor arrangement for detecting seat belt latch status and seat belt tension of claim 19 wherein motion of the tongue causes motion of the latch, and wherein the magnet is mounted to move with the latch and the sensor is fixedly mounted to the buckle and detects movement of the magnet on the latch.

21. The seat belt buckle and sensor arrangement for detecting seat belt latch status and seat belt tension of claim 19 wherein the magnet and the magnetic sensor are fixedly mounted to the base and detect the presence and position of the tongue and the latch.

* * * * *